United States Patent
Bougtaghou et al.

(10) Patent No.: US 6,643,106 B2
(45) Date of Patent: Nov. 4, 2003

(54) METHOD OF SHUNTING AND DESHUNTING A MAGNETIC READ ELEMENT DURING ASSEMBLY

(75) Inventors: Zine-Eddine Bougtaghou, Vadnais Heights, MN (US); Peter R. Segar, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 179 days.

(21) Appl. No.: 09/904,469

(22) Filed: Jul. 13, 2001

(65) Prior Publication Data

US 2002/0044392 A1 Apr. 18, 2002

Related U.S. Application Data

(60) Provisional application No. 60/217,992, filed on Jul. 13, 2000.

(51) Int. Cl.⁷ .............................. G11B 5/39; G11B 5/10
(52) U.S. Cl. ..................................... 360/323; 360/234.5
(58) Field of Search ........................... 360/323, 234.5

(56) References Cited

U.S. PATENT DOCUMENTS

| | | | |
|---|---|---|---|
| 4,785,366 A | | 11/1988 | Krounbi et al. |
| 5,465,186 A | * | 11/1995 | Bajorek et al. ............. 360/323 |
| 5,638,237 A | | 6/1997 | Phipps et al. |
| 5,699,212 A | * | 12/1997 | Erpelding et al. ....... 360/245.8 |
| 5,757,590 A | | 5/1998 | Phipps et al. |
| 5,805,390 A | * | 9/1998 | Takeura ...................... 360/323 |
| 5,903,415 A | | 5/1999 | Gill |
| 6,104,048 A | | 8/2000 | Wang et al. |
| 6,137,660 A | | 10/2000 | Partee et al. |
| 6,146,813 A | | 11/2000 | Girard et al. |
| 6,163,443 A | * | 12/2000 | Hatagami et al. ........... 360/323 |
| 6,219,205 B1 | | 4/2001 | Yuan et al. |
| 6,373,660 B1 | * | 4/2002 | Lam et al. ............... 360/234.5 |

* cited by examiner

Primary Examiner—David Lometz
(74) Attorney, Agent, or Firm—Merchant & Gould P.C.

(57) ABSTRACT

An intermediate article of manufacture of a magnetoresistive head with a protective device having sensor elements with terminal pads and a shunt element connected across the sensor element for shunting the sensor element to discharge static electrical charge during the manufacture of the magnetoresistive head. The shunt element is a piece of solder extending between the first and second terminals.

16 Claims, 5 Drawing Sheets

METHOD OF SHUNTING AND DESHUNTING A MAGNETIC READ ELEMENT DURING ASSEMBLY

This application claims the benefit of U.S. Provisional Application No. 60/217,992, filed Jul. 13, 2000.

FIELD OF THE INVENTION

The present invention relates generally to methods for eliminating or reducing potential damage to devices from electrostatic discharge or electrical overstress and, more particularly, to methods for reducing such damage to electronic components such as, but not limited to, a magnetoresistive head forming part of a disc drive.

BACKGROUND OF THE PRESENT INVENTION

Damage due to electrostatic discharge (ESD) and/or electrical overstress (EOS) costs industry in damaged and irreparable goods. More specifically, ESD/EOS damage is a particular problem in the electronics industry where the components are designed to conduct electricity in the first instance and where their continuously shrinking size renders them increasingly susceptible to such damaging effects. Generally, ESD refers to actual discharges while EOS refers to the effects of such discharges or currents induced by such discharges or other electrical or magnetic fields. For present purposes, reference to one should be interpreted to include the other.

ESD, familiarly manifested by the lightning bolts or by the shock received when touching a door knob after walking across a carpet, can range from a few volts to as much as several thousand volts, resulting in extremely large transient currents. As electronic components shrink in size they become ever more susceptible to damage from smaller and small voltages and current.

ESD can arise in several different ways, most commonly as a result of triboelectric charging or induction. Triboelectric charging causes a charge build up due to the frictional engagement of two objects. That is, static charge builds up as a result of a series of contacts and separations of two objects. Consequently, a net charge of opposite sign builds up and remains on both of the objects after their separation. Where the object has good conductivity and is grounded, charge will flow to the ground. If the electric field generated by the separated charges is strong enough, an electrostatic discharge can occur in the form of a spark traveling across an air gap from one object towards an object at a lower electrostatic potential. This discharge can occur either as one object is brought next to one of the charged objects or as one object is separated from the other.

Static charges can also build up by induction. If a charged object is brought near an uncharged object, the electric field of the charged object will induce a charge in the uncharged object, generating an electric field and potentially a static discharge.

A goal in many industries is to determine methods and apparatus for reducing or eliminating static discharges. Companies that manufacture and assemble disc drives are one of the electronics industries affected by ESD/EOS damage. As noted above, present disc drives include a disc rotated at high speeds and a read/write head that "flies" a microscopic distance above the disc surface. The disc includes a magnetic coating that is selectively magnetizable. As the head flies over the disc, it "writes" information, data, to the disc drive by selectively magnetizing small areas of the disc; in turn, the head "reads" the data written to the disc by sensing the previously written selective magnetizations. The read/write head is affixed to the drive by a suspension assembly and electrically connected to the drive electronics by an electrical interconnect. This structure (suspension, electrical interconnect, and read/write head) is commonly referred to in the industry as a Head Gimbal Assembly, or HGA.

More specifically, currently manufactured and sold read/write heads include an inductive write head and a magnetoresistive (MR) read head or element or a "giant" magnetoresistive (GMR) element to read data that is stored on the magnetic media of the disc. The write head writes data to the disc by converting an electric signal into a magnetic field and then applying the magnetic field to the disc to magnetize it. The MR read head reads the data on the disc as it flies above it by sensing the changes in the magnetization of the disc as changes in the voltage or current of a current passing through the MR head. This fluctuating voltage in turn is converted into data. The read/write head, along with a slider, is disposed at the distal end of an electrical interconnect/suspension assembly.

Other types of read heads, such as inductive read heads, are known, but the MR and GMR elements enable the reading of data that is stored more densely than that which was allowed with the use of inductive read element technology. MR and GMR read elements are much more sensitive to current transients resulting from voltage potentials and thermal gradients, however, then the previous read element technologies. It is now becoming increasingly necessary to manage environmental electrostatic charge levels to as low as 3.3 volts during HGA manufacturing processes so as not to damage the MR and GMR elements. Failing to do so, or failing to provide an avenue for the safe discharge of the accumulated electrostatic charge can result in damage to the MR and GMR heads.

Damage to an MR or GMR head can be manifested as physical damage and/or magnetic damage. In the former, melting of the read element in the head can occur because of the heat generated by the transient current of the discharge. Magnetic damage can occur in the form of loss of sensing ability and instability. Furthermore, direct discharge into the head is not necessary to create the damage. Damaging current flow in the head can also reportedly be created through electromagnetic interference as a result of a distant discharge.

Figure 1:
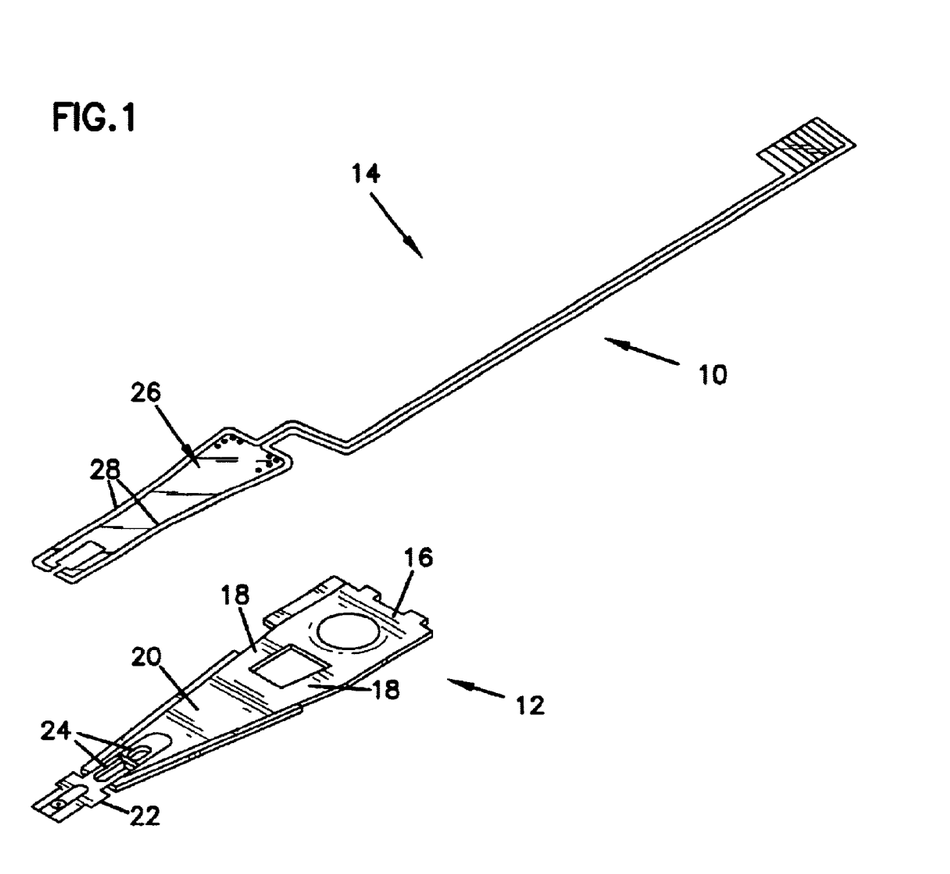
FIG. 1 is an illustrative, exploded, perspective view of a typical suspension/interconnect assembly.

An exploded view of a typical electrical interconnect/suspension assembly 10 is shown in FIG. 1, which illustrates several components including a suspension 12 and an interconnect 14. It will be understood that the actual physical structures of these components may vary in configuration and that the assembly shown in FIG. 1 is meant to be illustrative of the prior art only. Typically, the suspension 12 will include a base plate 16, a radius (spring region) 18, a load beam 20, and a gimbal 22. At least one tooling aperture 24 may be included. An interconnect 14 may include a base 26, which may be a synthetic material such as a polyimide, that supports typically a plurality of electrical traces or leads 28 of the interconnect. The electrical interconnect 14 may also include a polymeric layer that encapsulates selected areas of the electrical traces or leads 28.

Stated otherwise, suspension 12 is essentially a stainless steel support structure that is secured to an armature in the disc drive. A read/write head (not shown) is attached to the tip of the suspension 12 with adhesive or solder, generally. The aforementioned electrical interconnect 14 is terminated to bond pads on the read/write head and forms an electrical path between the drive electronics (not shown) and the read and write elements in the read/write head. The electrical interconnect 14 is typically comprised of individual electrical conductors supported by an insulating layer of polyimide and typically covered by a cover layer. Prior to the time that the HGA is installed into a disc drive, the electrical interconnect is electrically connected to the read and write elements, but is not connected to the drive electronics. As a result, the individual conductors 28 that make up the electrical interconnect 14 can easily be charged by stray voltages, thereby creating a voltage potential across the sensitive MR or GMR read elements, which when discharged results in damaging current transients through the read element.

The components shown in FIG. 1 as well as all those associated with disc drives are small and continually decreasing in size. Consequently, any tolerance for ESD/EOS damage of the components during the assembly process is also continuously decreasing while their susceptibility to damage during assembly is increasing. As noted, an ESD can actually damage or destroy circuit pathways in small electronic parts, such as an MR head, requiring the head to be discarded.

It is desirable to have a method of creating and removing electrical shorts in sensitive electronic components. More specifically, it is desirable to have a method of creating and removing an electrical short to prevent ESD/EOS damage in an MR head.

SUMMARY OF THE INVENTION

According to a first aspect of the invention, there is provided an intermediate article of manufacture of a magnetoresistive head with a protective device. The device includes a sensor element having terminal pads and a shunt element having a first and second terminal connected across the sensor element for shunting the sensor element to discharge static electrical charge during the manufacture of the magnetoresistive head. The shunt element being a piece of solder extending between the first and second terminals.

According to a second aspect of the invention, there is provided a method for substantially protecting an electronic component from EDS/EOS, the component including a pair of spaced apart leads for conducting current. The method includes the step of applying a conductive element between the pair of spaced part leads wherein the conductive element provides a shunt between the pair of spaced apart leads.

According to a third aspect of the invention, there is provided an intermediate article of manufacture of a magnetoresistive head with a protective device. The article includes a sensor element having terminal pads and means connected across the sensor element for shunting the sensor element to discharge static electrical charge during the manufacture of the magnetoresistive head.

DETAILED DESCRIPTION OF THE PRESENTLY PREFERRED EMBODIMENTS

Figure 2:
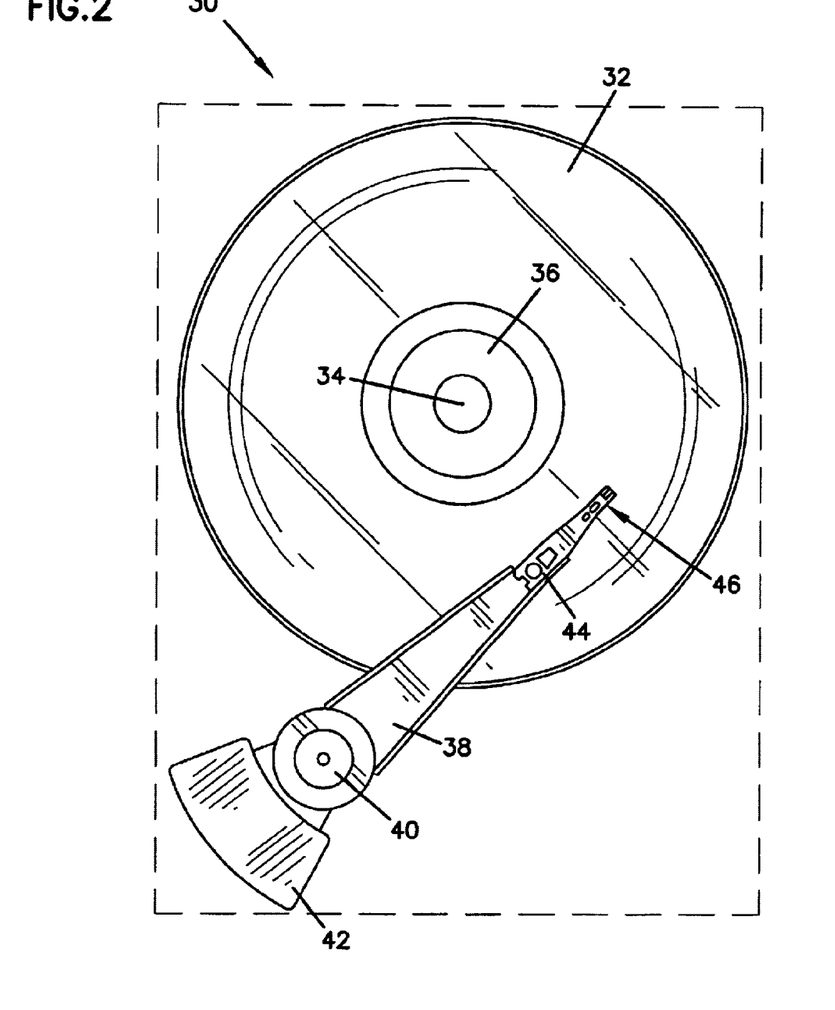
FIG. 2 is a top plan view of a disc drive.
Figure 3:
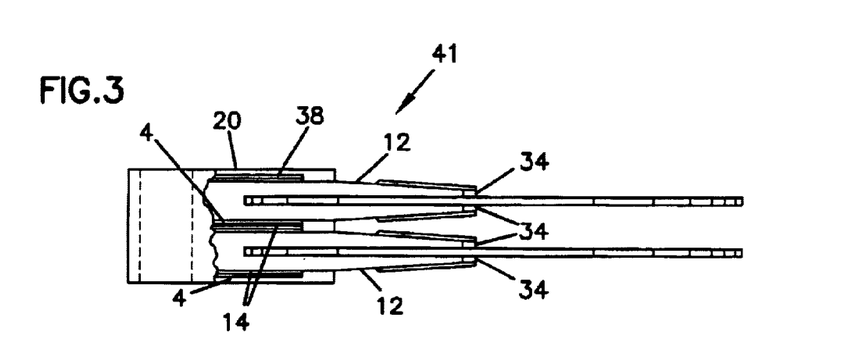
FIG. 3 is a partial side elevation, partial view of a hard disc drive, such as that shown in FIG. 1.

FIG. 2 illustrates a disc drive 30 in a top plan, highly schematic view. It will be understood that many of the components found in such a disc drive 30, such as a memory cache and the various controllers are not shown in the figure for purposes of clarity. As illustrated, drive 30 includes at least one, and typically several, discs 32 mounted for rotation on a spindle 34, the spindle motor and bearing not being shown for purposes of clarity. A disc clamp 36 is used to position and retain the disc 32 on the spindle 34. The disc drive 30 further includes an "E" block 41, best seen in FIG. 3. The E block 41 gets is name from its shape as viewed from the side. It will be observed that E block 41 includes a plurality of actuator arms 38, 42, and 44, which are supported for pivotal motion by an actuator pivot bearing 40. A voice coil motor assembly 42 is used to control the pivoting motion of the actuator arms 38, 42, 44.

As previously mentioned with reference to FIG. 1, each actuator arm includes a head gimbal assembly 10 comprising a suspension 12, a read/write head/slider 22, and interconnect 14 that extends from the head/slider to the drive electronics (not shown).

Figure 4:
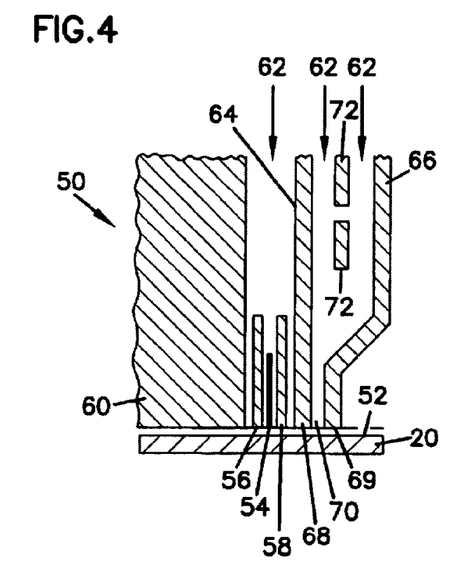
FIG. 4 is a cross-sectional view of a portion of a read/write head according to a preferred embodiment of the present invention.
Figure 5:
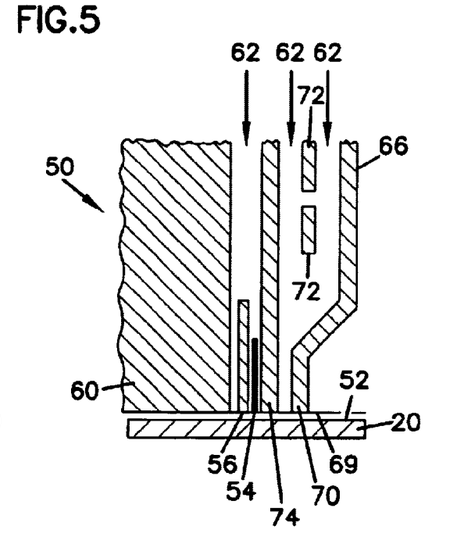
FIG. 5 is a cross-sectional view of a portion of a read/write head according to another preferred embodiment of the present invention.

Referring now to FIGS. 4 and 5, a portion of an MR read/inductive write magnetic head or magnetic head assembly or head 50 is shown in transducing relationship with a rotating magnetic disc 20 such that an air bearing surface 52 (ABS) is disposed in facing relationship with and slightly above the disc recording surface. Generally, such a magnetic head assembly 50 includes an MR read assembly and an inductive write assembly formed adjacent to one another on a substrate surface. The substrate surface is typically the vertical surface forming the trailing end of the slider carrying the magnetic head. The MR read assembly comprises an MR sensing element 54 fabricated of a ferromagnetic material, such as nickel-iron (NiFe) alloy, for example, which is enclosed by first and second magnetic shield elements 56 and 58, respectively. The MR sensing element can include a multiple layer magnetic structure, including magnetic bias layers, of the type described in commonly assigned U.S. Pat. No. 4,785,366 or of the type described in commonly assigned U.S. Pat. No. 5,206,590, utilizing the giant MR effect. The shield elements 56 and 58 are generally made of a highly permeable magnetic material, such as NiFe or Sendust, a trialloy of aluminum-silicon-iron. The magnetic shield elements 56 and 58 minimize or eliminate magnetic interferences from affecting the MR sensing element 54 and thereby producing extraneous electrical pulses. Conductive leads of tantalum (Ta) or copper (Cu) or other suitable conductive material, attached electrically at the end portion of the MR element 54 and couple the MR sensing element to external circuitry to provide a means for sensing the resistance of the MR sensing element.

The MR read assembly is formed by well-known vacuum deposition techniques, such as sputter deposition, for example, on the substrate 60. Layers 62 of insulating material surround and insulate the various elements of the MR assembly from each other. For example, the layers 62 are made from silicon dioxide ($SiO_2$) or aluminum oxide ($Al_2O_3$).

The inductive write assembly comprises a lower or first pole piece 64 and an upper or second pole piece 66. The first and second pole pieces 64, 66 are made of a highly permeable magnetic material such as NiFe, for example. The first and second pole pieces 64, 66 form a magnetic circuit magnetically connected together at a back gap portion (not shown) with the first and second pole tips 68, 69 forming a magnetic gap 70 at the air bearing surface 52. One or more layers of electrical conductors 72, generally made of Cu, for example, form a write coil 64 disposed between the first and second pole pieces 64, 66. The write coil 64 also connects to external circuitry via conductive leads (not shown). The pole pieces 68, 69 and the write coil conductors are fabricated by well-known processes such as electro-plating or sputter deposition, for example. Layers 62 of insulating material electrically insulate the pole pieces from the write coil and the MR read assembly. In addition, a capping layer 62 of insulating and protective material covers the entire assembly.

The magnetic head assembly 50 shown in FIG. 4 is sometimes referred to as a "piggyback" head. FIG. 5 shows an alternate configuration referred to as a "merged" head where the second MR magnetic shield element 58 is merged with the inductive assembly first pole piece 68 to form a single element 74 which performs both functions. In addition, the terms "MR sensor element" and "MR sensing element" broadly to also include spin valve structures as described in the aforementioned U.S. Pat. No. 5,206,590 hereby incorporated by reference.

As previously described, static electrical charges built up on the various components of the magnetic head assembly 50 or on any object, equipment or person which may come into contact with or closely approach the magnetic head assembly or any electrical leads attached to the magnetic head assembly pose the potential for serious damage to the magnetic head assembly. These charges are built up during the manufacturing process and during subsequent handling of the heads. For example, the assembly of the head with other components to produce a disc drive assembly can result in relatively large amounts of static electrical charge accumulating on the head elements. The electrical charges migrate from the areas at which they are generated to build up along conductive paths. Thus a buildup of static charge occurs that subsequently results in a discharge from one conductive element across a dielectric, which experiences "breakdown," to another conductive element, in the manner of a capacitive discharge. The discharge typically causes damage by burnout or the like at the areas of the conductive material which act as terminals for the discharge of the stored static electrical energy.

While the coil conductors 72 withstand relatively high voltages and currents, the MR sensing element is particularly sensitive to current and voltage overloads because of its physically small cross-section. The active sensing portion of the MR element has a length in the range of about 0.5 to about 20 $\mu$m, a height (width) of about 0.5 to about 5 cm and a thickness of about 10 to about 100 nanometers (nm) and a resistance of about 20 to about 80 ohms. In MR read assemblies of the types shown in FIGS. 4 and 5, damage occurs along the sensing region of the MR sensing element 54 when the accumulated static charge is discharged through the MR sensing element 54 or from the MR sensing element to the magnetic shield elements, first pole piece or the slider body (substrate).

Figure 6:
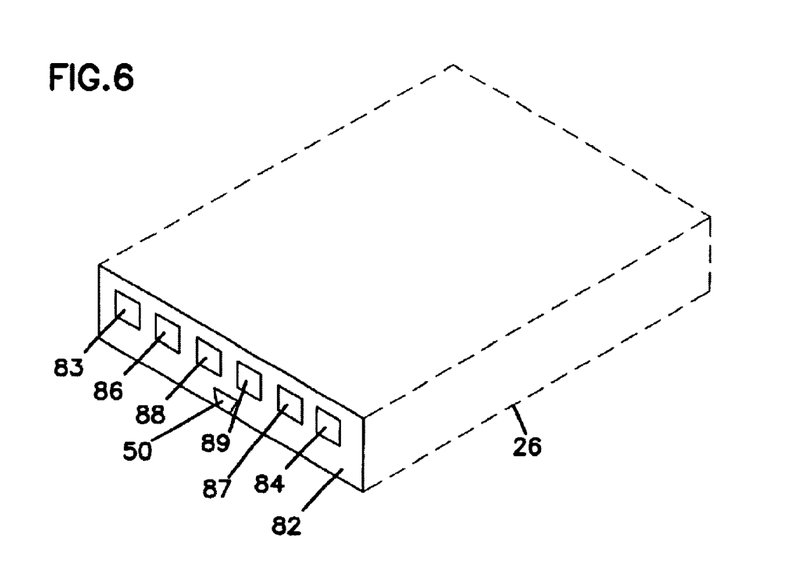
FIG. 6 is a simplified diagram illustrating the magnetic head terminal pads on the trailing edge wall of a slider.
Figure 7:
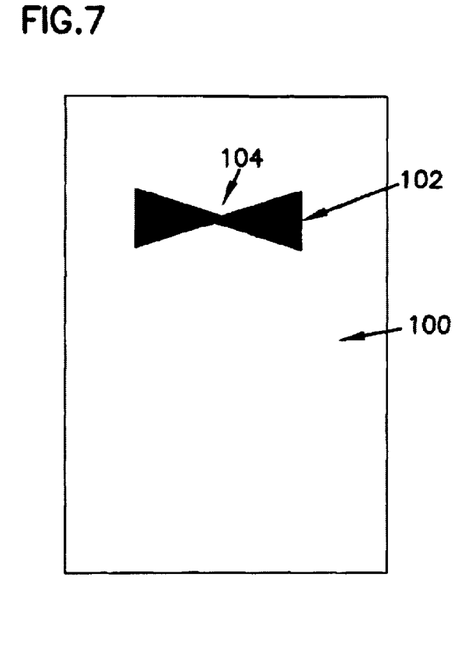
FIGS. 7–10 illustrate a method of protecting a magnetic read element from ESD/EOS according to a preferred embodiment of the present invention.

Referring now to FIG. 6, the head 50 is formed in the slider 26 trailing edge with the conductive terminal pads exposed on the vertical surface 82. The terminal pads provide electrical connections for the magnetic head to an interconnect circuit such as that shown in FIG. 1. Conductive leads (not shown) connect the write coil 72 to first and second write coil terminal pads 83, 84. Similarly, the MR read element is provided with first and second MR terminal pads 86, 87 for connection to the interconnect circuit. Conductive leads connect the MR sensing element to the MR terminal pads, 86, 87.

FIGS. 7–10 illustrate a method of protecting a magnetic read element from ESD/EOS according to a preferred embodiment of the present invention. A substrate 100 is provided. The substrate forms a slider of a disc drive. First an insulator is deposited on the wafer's surface. If the wafer is formed of silicon (Si), then preferably silicon dioxide ($SiO_2$) is deposited. If the wafer is formed of AlTiC, then a layer of aluminum oxide ($Al_2O_3$) is deposited. Formed on the top layer of the substrate 100 is a trench 102 in the shape of a bow tie. It will be appreciated that the shape of the trench 102 may be varied. The trench 102 is narrowest at area 104, which will be referred to as the shunt junction, and is symmetrical about area 104. The trench 102 has a depth ranging from about 10 $\mu$m to about 5 $\mu$m. The trench may be substantially uniform in depth or it may have different depths at different locations.

Figure 8:
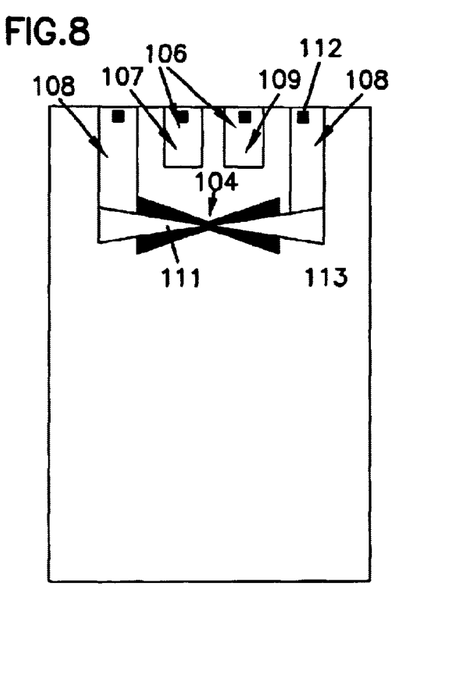

Next, as shown in FIG. 8, conductors are deposited. Preferably a pair of inductive conductors 106 and a pair of GMR conductors 108 are deposited as shown. The inductive conductors 106 have first and second terminals 107, 109 that are coupled to a write element (not shown) and the GMR conductors 108 have first and second terminals 111, 113 that are coupled to a GMR read element (not shown). The pair of GMR conductors 108 have portions 110 extending into the trench 102, but do not meet at area 104. At the point in the processing shown in FIG. 8, the shunt junction is open. Through holes 112 may be formed near the edge of the wafer 100 for coupling the device circuits such as a GMR to the conductors.

Figure 9:
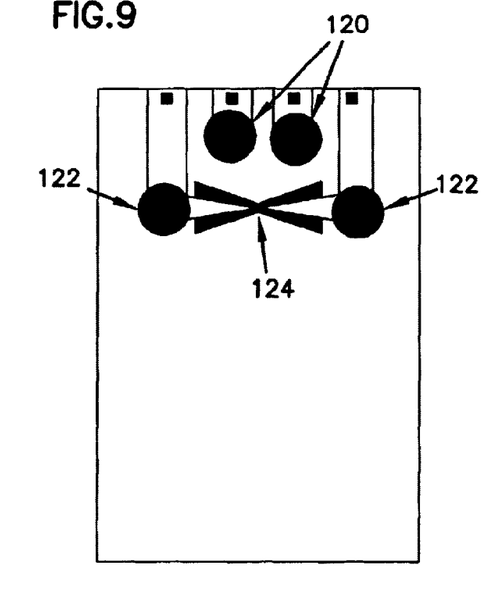

Next, as shown in FIG. 9, solder bumps are platted on the wafer. More particularly, solder bumps 120 are placed at the ends of inductive conductors 106 and solder bumps 122 are placed on GMR conductors 108. Solder 124 is also applied to the shunt junction to close the shunt junction.

Figure 10:
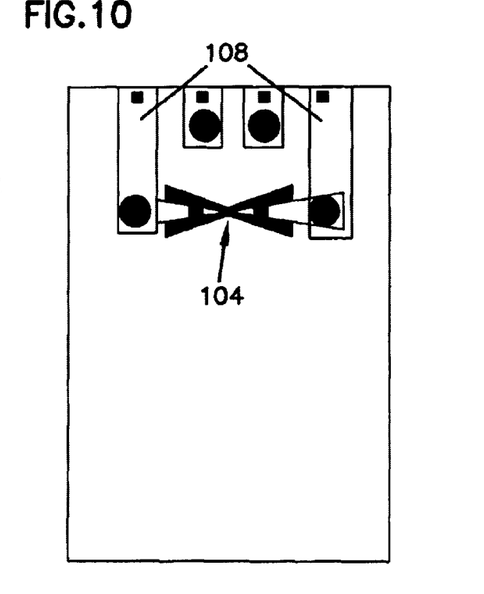

The slider is now ready to be attached to the head gimbal assembly. Heat is applied to the solder bumps 120, 122. Heat is also applied to the solder 124 in the shunt junction causing it to re-flow into the channel, thereby opening the shunt junction. Thus, during the processing of the slider the GMR transducer is shunted, thereby protecting the transducer from ESD.

Figure 11:
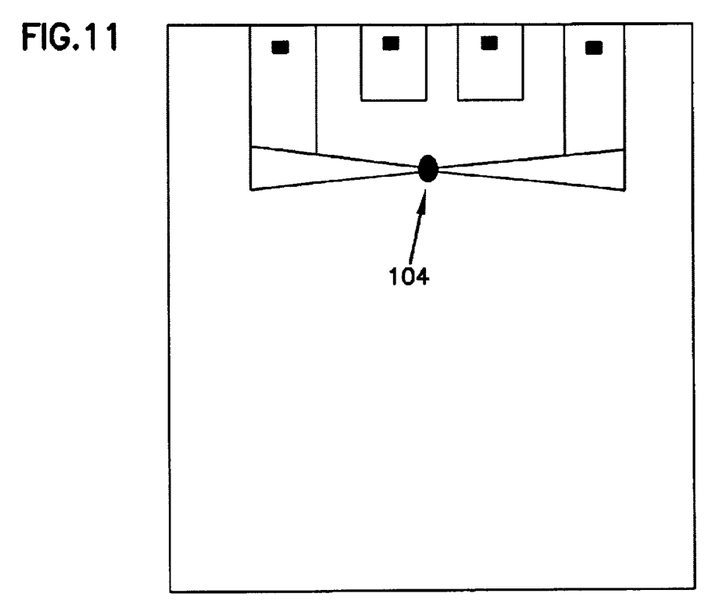
FIGS. 11–12 illustrate a method of protecting a magnetic read element from ESD/EOS according to another preferred embodiment of the present invention.
Figure 12:
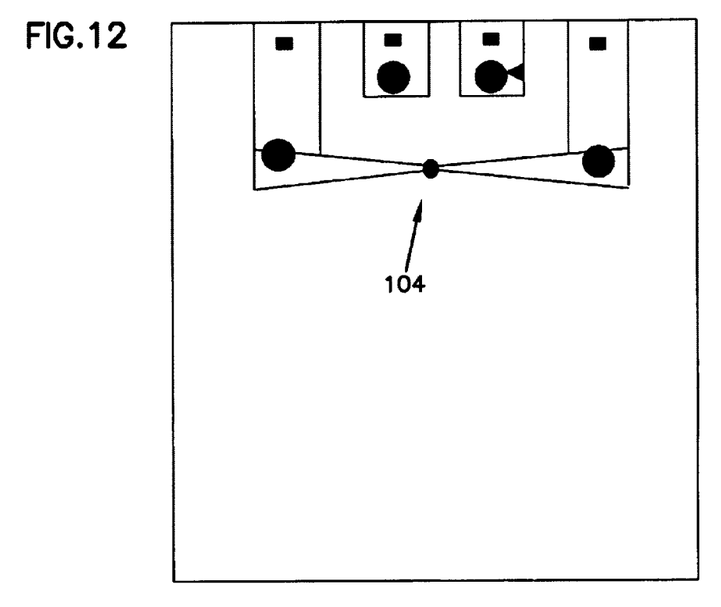

FIGS. 11–12 show another preferred embodiment of processing the slider. In this preferred embodiment, no channel is created in the substrate. Instead, the top surface of the slider is treated to cause the solder to reflow. More particularly, the shunt junction area 204 is treated with a surfactant. Solder bumps 220, 222 are deposited as in the previously described preferred embodiment. Solder 224 is also applied to the shunt junction, thereby closing the junction. The shunt junction is opened when heat is applied to couple the slider to the head gimbal assembly.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An intermediate article of manufacture of a magnetoresistive head with a protective device comprising:
   a sensor element having terminal pads;
   a shunt element having first and second terminals connected across the sensor element for shunting the sensor element to discharge static electrical charge during the manufacture of the magnetoresistive head, the shunt element further including solder that extends between the first and second terminals; and
   a channel located underneath the sensor element, wherein when heat is applied to the shunt element at least a portion of the solder flows into the channel to open the shunt element thereby removing the shunt.

2. The article of manufacture according to claim 1 further comprising a write coil.

3. The article of manufacture of claim 1 wherein the sensor is a magnetoresistive sensor.

4. The article of manufacture of claim 1 wherein the sensor is a giant magnetoresistive sensor.

5. The article of manufacture according to claim 1 wherein the channel has the shape of a bow tie and the shunt element is located in the center of the channel.

6. The article of manufacture according to claim 1 further comprising a surfactant located between the shunt element and the sensor element.

7. A method for substantially protecting an electronic component from EDS/EOS, said component including a pair of spaced apart leads for conducting current; the method comprising the step of:
   applying a conductive element between the pair of spaced apart leads wherein the conductive element, the conductive element including solder and providing a shunt between the pair of spaced apart leads;
   forming a channel underneath the conductive element;
   melting at least a portion of the solder to remove the shunt; and
   collecting the melted solder in the channel.

8. The method of claim 7 wherein the electronic component is a read/write head of a disc drive.

9. The method of claim 7 wherein the electronic component is a read/write head of a disc drive and the pair of spaced apart leads are a portion of an electrical interconnect leading to and from the read/write head, the melting step creating an electrical discontinuity in the solder to cause the solder to lose its electrical continuity and create an open circuit between the pair of spaced apart leads.

10. An intermediate article of manufacture of a magnetoresistive head with a protective device comprising:
    a sensor element having terminal pads;
    shunting means connected across the sensor element for shunting the sensor element to discharge static electrical charge during the manufacture of the magnetoresistive head; and
    a channel located underneath the sensor element wherein when heat is applied to the shunting means at least a portion of the shunting means flows into the channel to remove the shunt.

11. The article of manufacture according to claim 10 wherein the shunting means includes solder.

12. The article of manufacture according to claim 10 further comprising a write coil.

13. The article of manufacture of claim 10 wherein the sensor is a magnetoresistive sensor.

14. The article of manufacture of claim 10 wherein the sensor is a giant magnetoresistive sensor.

15. The article of manufacture of claim 10 further comprising a surfactant located between the sensor element and the shunting means.

16. A magnetoresistive head with a protective device for discharging electrical charge during manufacture of the magnetoresistive head, comprising:
    a sensor element having sensor terminals;
    a shunt element having first and second shunt terminals connected to the sensor terminal, and further including solder connecting the first and second terminals together for shunting the sensor element; and
    a channel positioned adjacent the solder, wherein the channel is configured to collect at least a portion of the solder when the solder is heated to disconnect the first and second terminals and remove shunting of the sensor element.

* * * * *

UNITED STATES PATENT AND TRADEMARK OFFICE
CERTIFICATE OF CORRECTION

PATENT NO. : 6,643,106 B2
DATED : November 4, 2003
INVENTOR(S) : Boutaghou et al.

It is certified that error appears in the above-identified patent and that said Letters Patent is hereby corrected as shown below:

<u>Title page,</u>
Item [75], Inventors, "Zine-Eddine Bougtaghou" should read -- Zine-Eddine Boutaghou --

Signed and Sealed this

Twenty-second Day of June, 2004

JON W. DUDAS
*Acting Director of the United States Patent and Trademark Office*